US012423830B2

(12) United States Patent
Sharma

(10) Patent No.: US 12,423,830 B2
(45) Date of Patent: Sep. 23, 2025

(54) METHODS AND SYSTEMS OF REAL-TIME HIERARCHICAL IMAGE MATTING

(71) Applicant: TensorType Inc., Palo Alto, CA (US)

(72) Inventor: Gaurav Sharma, Newark, CA (US)

(73) Assignee: TensorType Inc., Palo Alto, CA (US)

( * ) Notice: Subject to any disclaimer, the term of this patent is extended or adjusted under 35 U.S.C. 154(b) by 352 days.

(21) Appl. No.: 18/119,206

(22) Filed: Mar. 8, 2023

(65) Prior Publication Data

US 2024/0095929 A1  Mar. 21, 2024

Related U.S. Application Data

(60) Provisional application No. 63/317,880, filed on Mar. 8, 2022.

(51) Int. Cl.
*G06T 7/194* (2017.01)
*G06T 7/12* (2017.01)

(52) U.S. Cl.
CPC .............. *G06T 7/194* (2017.01); *G06T 7/12* (2017.01); *G06T 2207/20021* (2013.01); *G06T 2207/20081* (2013.01); *G06T 2207/20084* (2013.01)

(58) Field of Classification Search
CPC . G06T 7/194; G06T 7/12; G06T 2207/20021; G06T 2207/20081; G06T 2207/20084; G06T 7/11
See application file for complete search history.

(56) References Cited

U.S. PATENT DOCUMENTS

| | | | | |
|---|---|---|---|---|
| 2015/0117779 A1* | 4/2015 | Schlosser | ............... | G06T 7/136 382/174 |
| 2021/0319564 A1* | 10/2021 | Xu | ........................... | G06T 7/11 |
| 2022/0262009 A1* | 8/2022 | Yu | ........................... | G06T 7/194 |
| 2023/0135978 A1* | 5/2023 | Price | ....................... | G06N 3/09 382/232 |
| 2024/0095929 A1* | 3/2024 | Sharma | .................. | G06T 7/194 |

OTHER PUBLICATIONS

Qiao, Yu, et al. "Hierachical and progressive image matting." ACM Transactions on Multimedia Computing, Communications and Applications 19.2 (2023): 1-23. (Year: 2023).*
Zhong, Yijie, et al. "Highly efficient natural image matting." arXiv preprint arXiv:2110.12748 (2021). (Year: 2021).*

* cited by examiner

*Primary Examiner* — Bobbak Safaipour
(74) *Attorney, Agent, or Firm* — Schwegman Lundberg & Woessner, P.A.

(57) ABSTRACT

In one aspect, a computerized method for implementing a hierarchical image matting framework comprising: with a hierarchical image matting framework: analyzing a plurality of patches in a set of input images; determining a complexity of each image in the set of input images, and processing each image according the complexity of each image to determine a plurality of complex patches of each image and a plurality of simpler patches of each image; routing a plurality of complex patches with finer details to a computationally heavier network; routing a plurality of those with simpler patches of each image to a relatively lighter network; and fusing the outputs from the computationally heavy network and the computationally light network to obtain a plurality of alpha mattes.

15 Claims, 8 Drawing Sheets

METHODS AND SYSTEMS OF REAL-TIME HIERARCHICAL IMAGE MATTING

CLAIM OF PRIORITY

This application claims priority to U.S. Provisional Application No. 63/317,880, filed 8 Mar. 2022 on and titled METHODS AND SYSTEMS OF REAL-TIME HIERARCHICAL IMAGE MATTING. This provisional application is hereby incorporated by reference in its entirety.

BACKGROUND

Image matting can be computationally expensive and not suitable for near real-time use. At the same time, the use of image matting may be needed in some real-time applications. Performing image matting at higher resolution incurs an unfavorable computation and memory load. Whereas, performing the same at a lower-resolution may result in unpleasant mattes without much finer details. Existing methods solve this problem by processing the image at different resolutions using multiple networks. As observed in, within an alpha matte, there may exist some image patches which require a light-weight processing to recover the semantic details. Some patches may use heavy-weight processing to recover the boundary sensitive details. Accordingly, improvements to image matting that use a hierarchical framework where a light-weight network is dedicated to recover the semantic details and a heavy-weight network recovers the boundary details are desired.

SUMMARY OF THE INVENTION

In one aspect, a computerized method for implementing a hierarchical image matting framework comprising: with a hierarchical image matting framework: analyzing a plurality of patches in a set of input images; determining a complexity of each image in the set of input images, and processing each image according the complexity of each image to determine a plurality of complex patches of each image and a plurality of simpler patches of each image; routing a plurality of complex patches with finer details to a computationally heavier network; routing a plurality of those with simpler patches of each image to a relatively lighter network; and fusing the outputs from the computationally heavy network and the computationally light network to obtain a plurality of alpha mattes.

Figure 1:
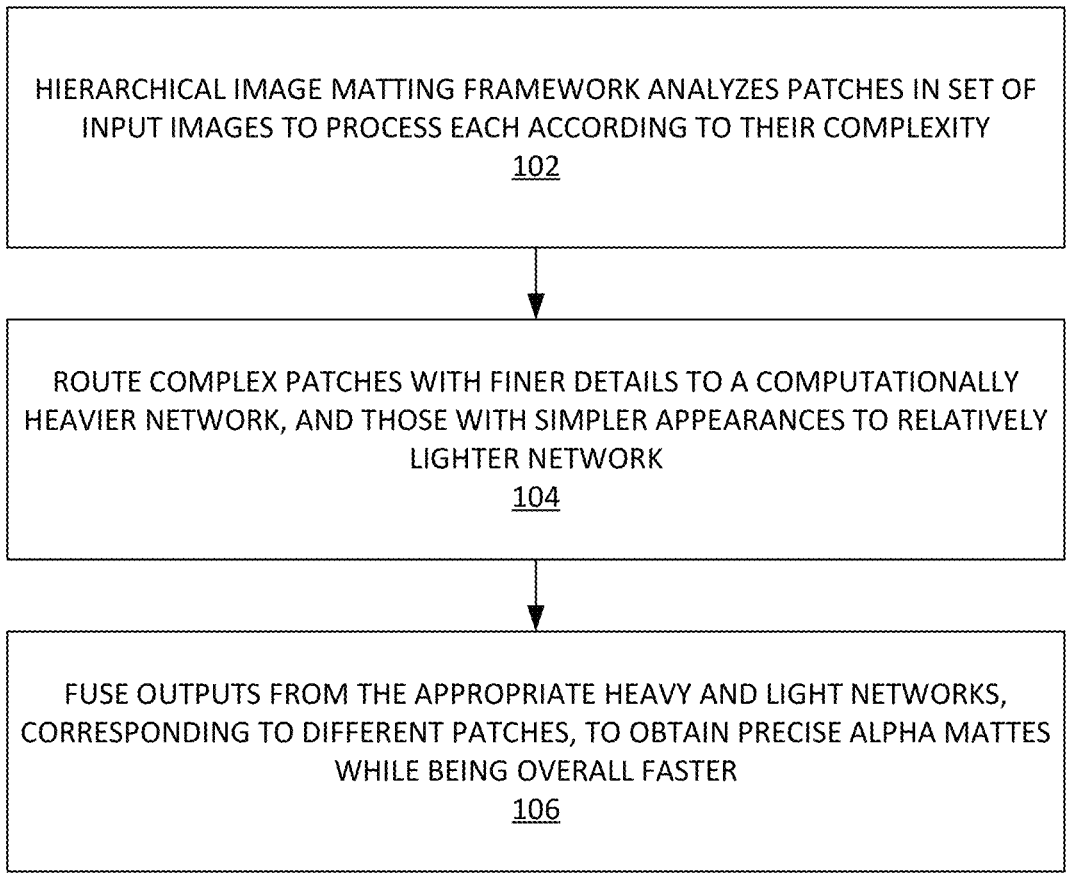
FIG. 1 illustrates an example process for implementing a hierarchical image matting framework, according to some embodiments.

The Figures described above are a representative set and are not exhaustive with respect to embodying the invention.

DESCRIPTION OF THE INVENTION

Disclosed are a system, method, and article of manufacture of real-time hierarchical image matting. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Atrous Spatial Pyramid Pooling (ASSP) is a semantic segmentation module for resampling a given feature layer at multiple rates prior to convolution.

Machine learning (ML) can use statistical techniques to give computers the ability to learn and progressively improve performance on a specific task with data, without being explicitly programmed. Deep learning is a family of machine learning methods based on learning data representations. Learning can be supervised, semi-supervised or unsupervised. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Mattes are used in photography and special effects filmmaking to combine two or more image elements into a single, final image.

Residual Neural Network (ResNet) is an artificial neural network (ANN). ResNets utilize skip connections and/or shortcuts to jump over some layers. The individual blocks of general ResNets could be made up of convolutional or self-attention/transformer blocks.

Spectral Normalization can be a normalization technique used for generative adversarial networks, used to stabilize training of the discriminator. It is also generally applicable to deep neural networks of various kinds.

Skip Connections can skip some of the layers in a neural network and feed the output of one layer as an input to the next layers.

Trimap specifies background, foreground, and uncertain pixels, which can be decomposed into foreground and background by the matting method.

Example Computer Architecture and Systems

Example methods of a patch-based hierarchical framework are provided. The patch-based hierarchical framework can be computationally efficient as well as accurate. It is noted that different parts of the objects may be of different complexity with respect to the matting task. Some parts may have very fine boundaries (e.g. curly hair, or machine parts, etc.) while others may have a flat boundary (e.g. face or body contour, or linear edges). Motivated by this fact, the patch-based hierarchical framework can use different models for such different complexity parts. The patch-based hierarchical framework can divide a digital image into disjoint patches and route these patches to different encoder sub-networks based on their complexities which are themselves estimated by another small sub-network. The patch-based hierarchical framework can then collect the feature maps of all the patches and generate the full image alpha matte by passing them to a global decoder sub-network. This allows the model to process the more complex parts with heavier sub-network. The patch-based hierarchical framework can process the lower complexity parts with lighter sub-network, improving the overall speed without sacrificing performance.

FIG. 1 illustrates an example process 100 for implementing a hierarchical image matting framework, according to some embodiments. In step 102, the hierarchical image matting framework analyzes patches in a set of input images, and processes them differently according to their complexity. In step 104, process 100 routes complex patches with finer details (e.g. furry edges, etc.) to a computationally heavier network, and those with simpler appearances to a relatively lighter network. In step 106, process 100 can then fuse the outputs from the appropriate heavy and light networks, corresponding to the different patches, to obtain the precise alpha mattes while being overall faster. In this way, process 100 can provide comparable and/or better alpha mattes when compared to existing competitive methods. Process 100 can obtain state-of-the-art results on challenging benchmark datasets, while being faster than the existing methods.

Figure 2:
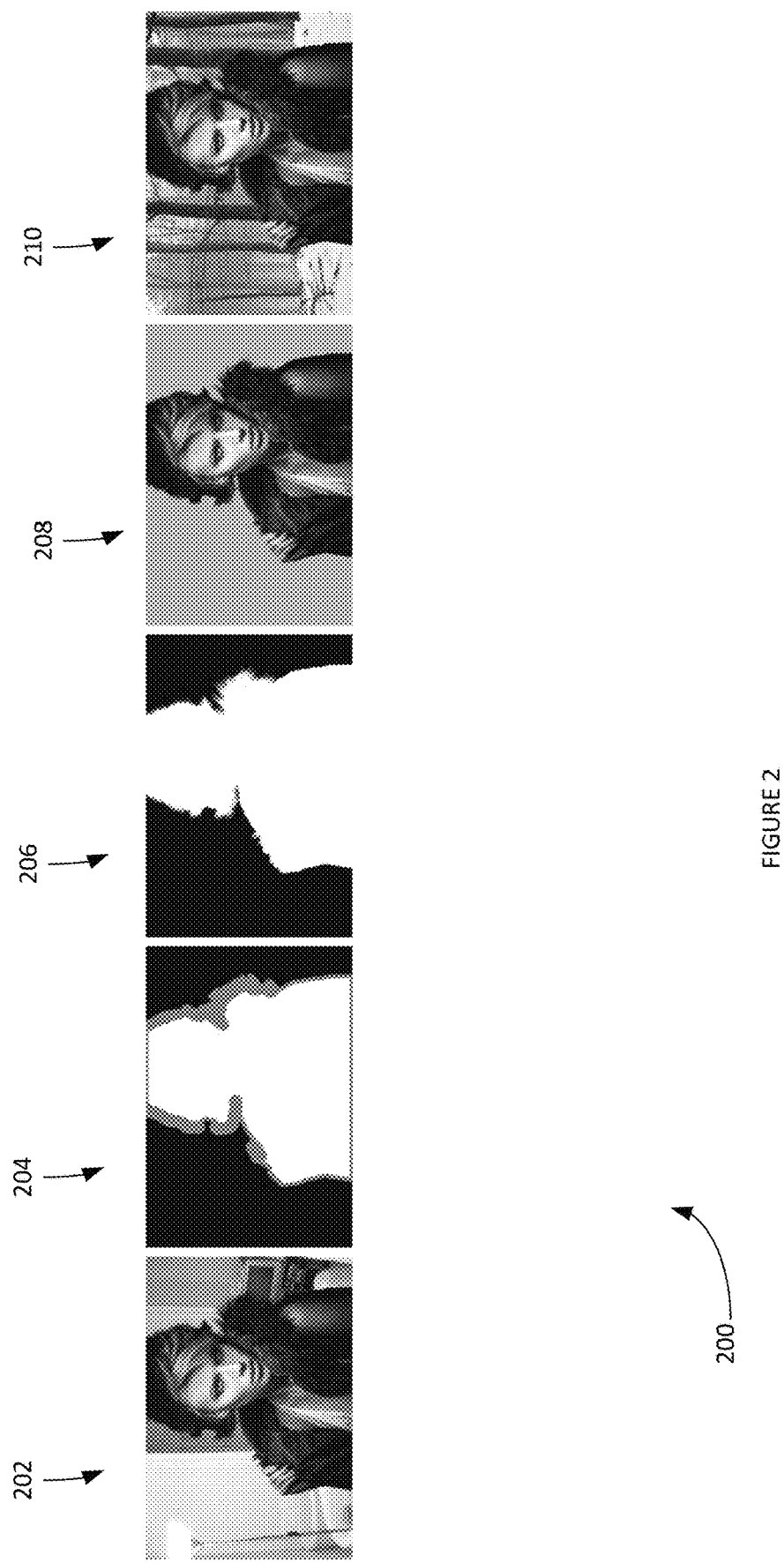
FIG. 2 illustrates an example qualitative demonstration of the problem of image matting in a set of images, according to some embodiments.

FIG. 2 illustrates an example qualitative demonstration of the problem of image matting in a set of images 200, according to some embodiments. Images 200 include: composited image 202, trimap 204, predicted alpha matte 206, extracted foreground using predicted alpha matte 208, and composited image with a new background 210. Digital image matting aims to precisely estimate the alpha matte to extract the foreground objects from the images. It has applications in several domains e.g. advanced photo and video editing and online content creation. Given a composited RGB image C, the following equation is used to define, in Equation 1, the relation with foreground F and background B regions using alpha matte a, as:

$$C_i = \alpha_i F_i + (1 - \alpha_i) B_i,$$

where $\alpha_i \in [0, 1]$ for each pixel i=1 ... HW for a H×W image. This equation can be highly ill-posed in nature, in RGB color-space, it has 7HW unknowns (e.g. 3 channels each in F and B, and a 1 channel $\alpha$ matte) and 3HW knowns (C). The tripmap 204 consists of three regions: foreground indicated by white, background by black and unknown by gray pixels. As a result, the solution space for a substantially reduces from $[0, 1]^{HW}$ to $[0, 1]^{|U|}$, where U denotes the pixels in the unknown gray regions in the trimap, with |U|<<HW. Although, the aim is to classify the pixels in the unknown region into foreground or background, the efficacy can depend on the correctness of the trimap 204.

Figure 3:
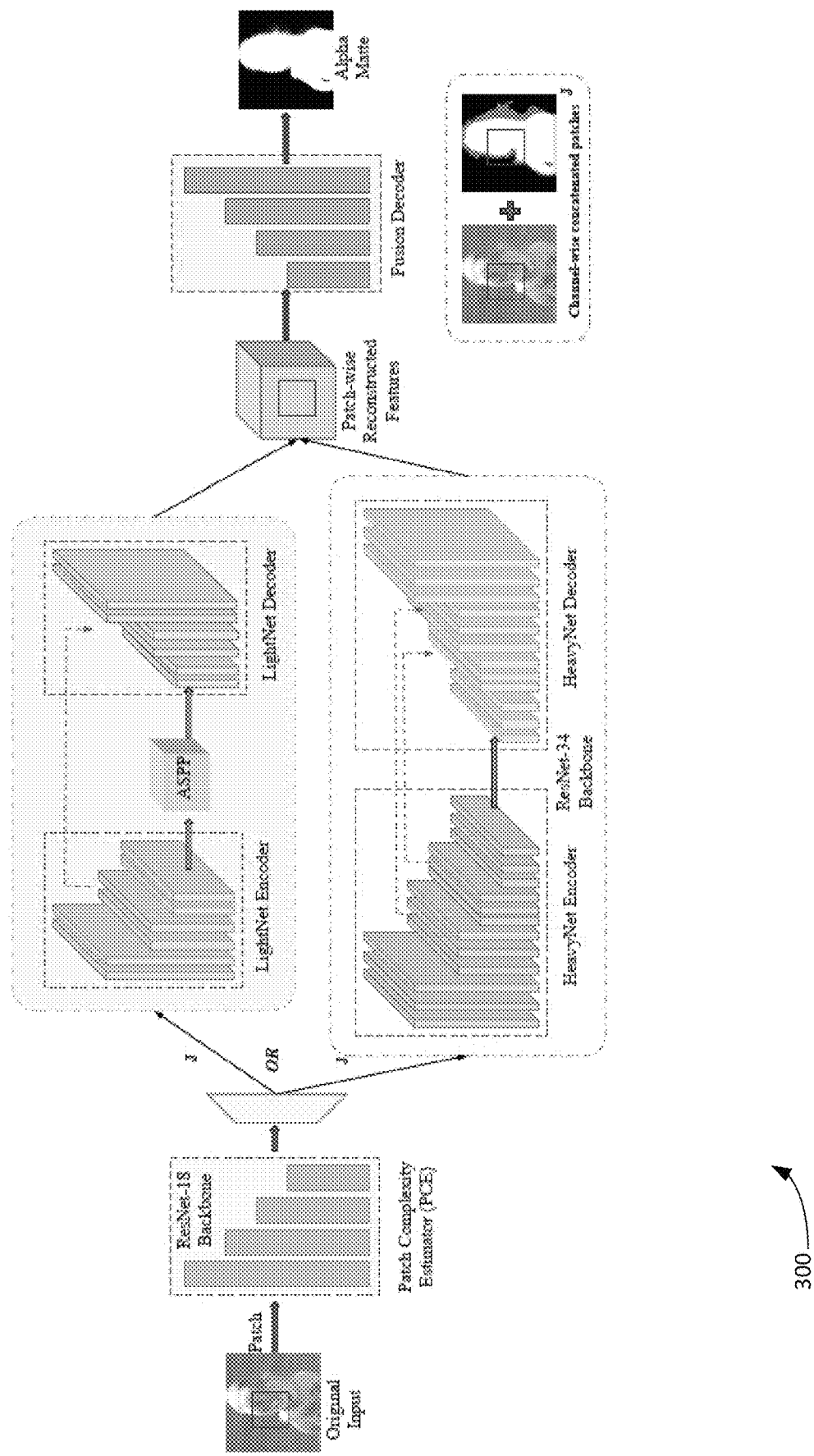
FIG. 3 illustrates an example image matting system, according to some embodiments.

FIG. 3 illustrates an example image matting system 300, according to some embodiments. Image matting system 300 can implement a patch-based hierarchical framework can divides the digital image into patches and processes each patch independently based on its complexity. Image matting system 300 uses light and heavy sub-networks to process the low and high complexity patches, respectively. The method incorporates the patch complexity estimation as an end-to-end learnable part of the network. Image matting system 300 include a large-scale dataset for deep image matting. This dataset can consist of variety of objects and scenarios that helps in improving the performance of the image matting models.

Following the equation discussed supra, to recover the α from C, the proposed framework comprises of four major modules: (a) Heavy Network ($\theta_H$), (b) Light Network ($\theta_S$), (c) Patch Complexity Estimator ($\theta_P$), and (d) Fusion Network ($\theta_F$).

For a given composited input image C, image matting system 300 first extracts the patches of shape 256×256 in a sliding window-manner. Then for each patch individually, image matting system 300 estimates its feature-level complexity, i.e., if the extracted patch requires heavy processing to recover the boundary sensitive information or a light processing to recover semantic details. Based on the following hypothesis, image matting system 300 routes the selected for further processing, $C_p^i$, as shown in in Equation 2.

$$m_{C_p^i} = \begin{cases} \theta_H(C_p^i), & \text{if } \theta_P(C_p^i) \geq 0.5 \\ \theta_S(C_p^i), & \text{otherwise} \end{cases}$$

Image matting system 300 uses the above patch-based routing hypothesis for each extracted patch and collects the set of matting features m. The set of features are then stitched back and input to the fusion decoder $\theta_F$. The output alpha matte $\hat{\alpha}$ is defined in Equation 3 as, $$\hat{\alpha} = \theta_F(g(m)),$$

where g denotes the stitching operation.

Heavy Network is now discussed. The proposed heavy network $\theta_H$ inherits the encoder-decoder framework with residual stacked blocks. The encoder part consists of ResNet as backbone whereas the decoder part comprises of ResNet. Image matting system 300 can utilize spectral normalization and an ReLU activation function after each convolution layer. The skip connections can be used to prevent slow training.

The proposed light network $\theta_S$ can also an encoder-decoder based framework, however cf. to $\theta_H$, $\theta_S$ constitutes significantly fewer layers. In particular, unlike $\theta_H$, $\theta_S$ does not comprise of heavy residual networks as backbones. $\theta_S$ can consist of ten convolutional blocks in encoder as well decoders with skip connections. At the bottleneck, image matting system 300 can use an ASPP module to exploit the multiscale features using a larger field-of-view, effectively helps in generating a globally consistent alpha matte. Image matting system 300 can use batch normalization.

A Patch Complexity Estimator can be used. In order to route the patch to a proper network among $\theta_H$ and $\theta_S$, $\theta_P$ can inherit a ResNet as a backbone and outputs a single scalar value in [0,1]. Based on Equation 2, if output is below 0.5, then image matting system 300 processes the input patch using $\theta_S$, otherwise using $\theta_H$.

The fusion network is now discussed. The fusion network $\theta_F$ takes outputs from $\theta_S$ and $\theta_H$ for all the patches in a stitched form. The final output may have some patch-based boundary artifacts. To remove such visual distortions, image matting system 300 can use Residual Dense Network (RDN) as the backbone for $\theta_F$. The RDN is shown to be beneficial for single image super-resolution task. Image matting system 300 uses this network to predict a high-quality final alpha matte with finer details, without any patchy visual distortion. However, in this case, image matting system 300 removes the up-scaling part from RDN network to maintain the same spatial scale.

Figure 4:
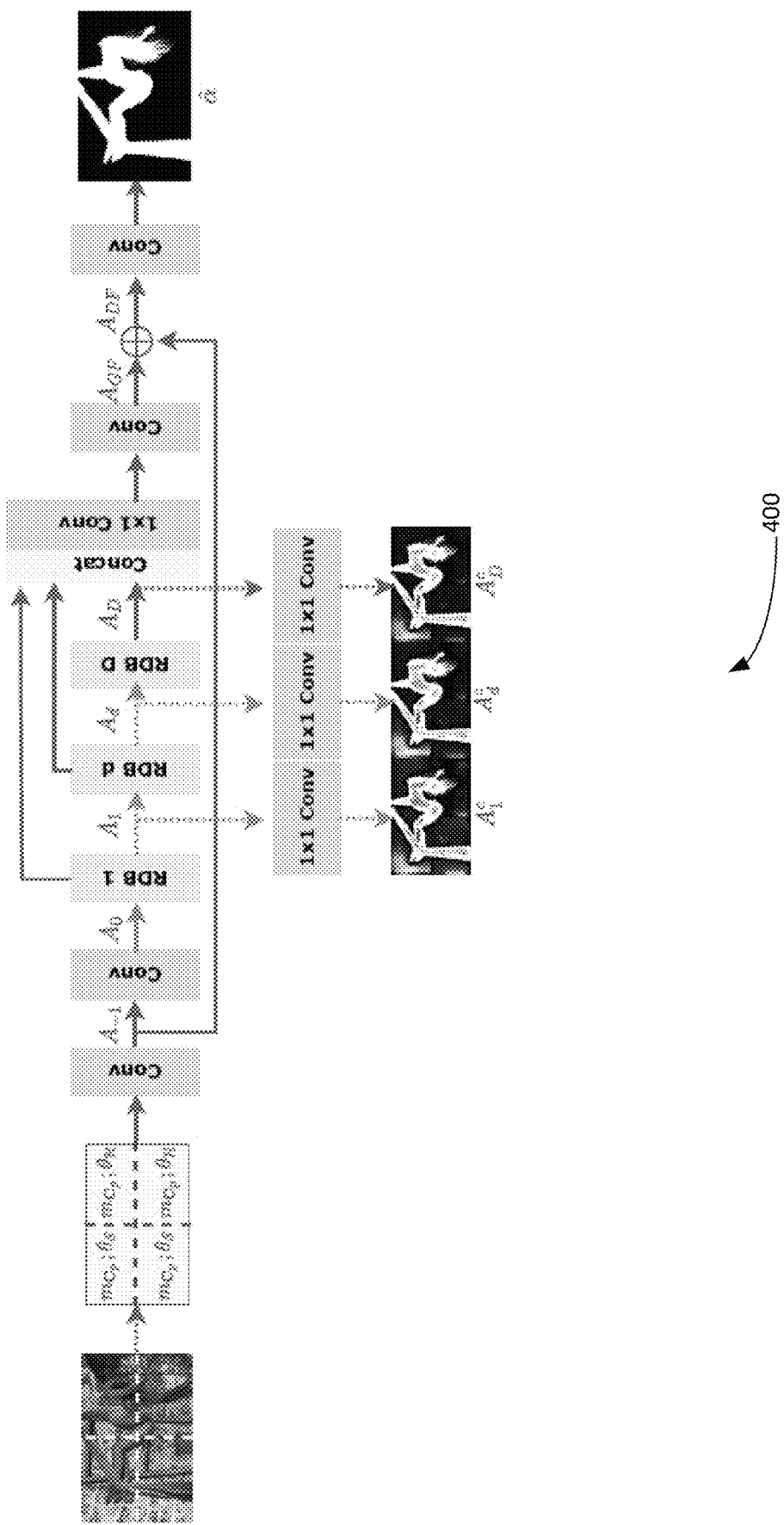
FIG. 4 illustrates an example structural view of $\theta_F$, according to some embodiments.

FIG. 4 illustrates an example structural view 400 of $\theta_F$, according to some embodiments. As shown, the fusion network $\theta_F$ can use the RDN as a backbone for generating the accurate alpha matte.

With the input as features from $\theta_S$ and $\theta_H$, $\theta_F$ initially learns the set of local dense features using "D" number of Residual Dense Blocks (RDB). Each RDB consists of densely connected convolutional layers with a local residual learning mechanism. While it preserves the local dense features, series of RDB blocks acts as a contiguous memory that helps in restoring the long-term high-frequency details. This is ensured by the feed-forward nature of the connections between the RDB blocks. Operations of $\theta_F$ are now discussed.

As shown in FIG. 4, let $m_{C_P}$; $\theta S$, $m_{C_P}$; $\theta_H$ denote the outputs from $\theta_S$ and $\theta_H$, respectively, for a given patch $C_P$. Image matting system 300 inputs the stitched form of such outputs for all patches to $\theta_F$. Each RDB block learns the distinct local dense features, as shown in FIG. 5.

Figure 5:
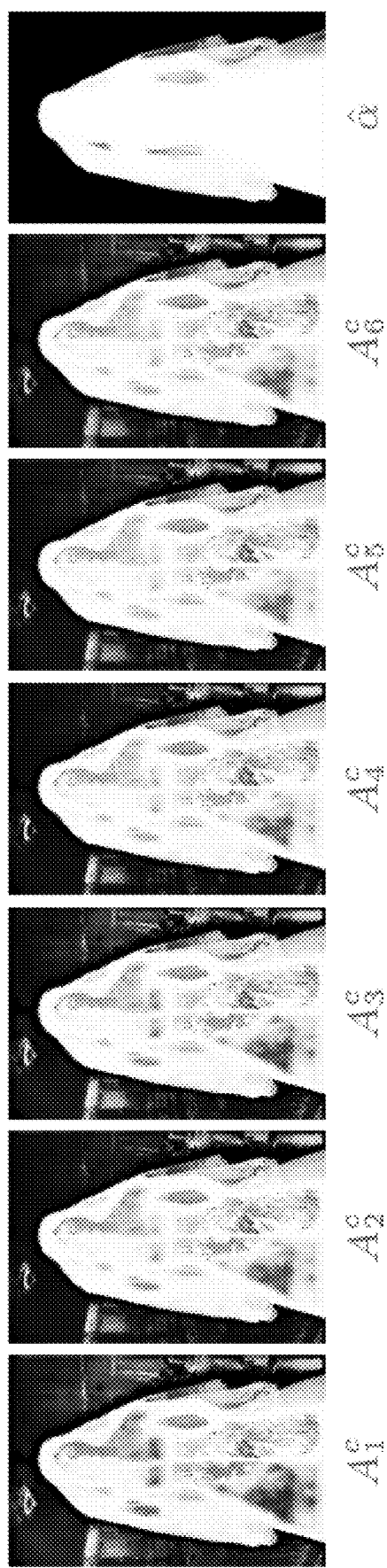
FIG. 5 illustrates an example local residual outputs from $\theta_F$, according to some embodiments.

FIG. 5 illustrates an example local residual outputs from $\theta_F$ 500, according to some embodiments. These residual features are denoted as A1, A2, ..., AD for D number of RDB blocks. Image matting system 300 then concatenates all the learned local dense features, performs 1×1 convolution, and generates a combined local residual dense feature $A_{GF}$ which contains local feature semantics at different texture levels. Image matting system 300 then performs the pixel-wise addition and generates a global feature ($A_{DF}$) that contains both original semantics from input to $\theta_F$ and refined local features comprise of better texture and edgy structures, as provided in Equation 4:

$$A_{DF} = A_{GF} \oplus A_{-1}$$

The proposed $\theta_F$ finally outputs the predicted alpha matte $\hat{\alpha}$.

Loss functions are now discussed. Image matting system 300 can use a definition of the alpha reconstruction loss as provided in Equation 5:

$$\mathcal{L}_R = \frac{1}{|u|} \sum_{i \in u} |\hat{\alpha}_i - \alpha_i|$$

where U denotes the unknown region in the trimap (e.g. only penalize the pixels that belongs to unknown region). Image matting system 300 also uses a composition loss operation. It is defined as the $\ell_1$ difference between the composited images generated by using predicted alpha matte and ground-truth alpha matte with ground-truth foreground and background images. Mathematically, it can be written as provided in Equation 6:

$$\mathcal{L}_C = \frac{1}{|u|} \sum_{i \in u} |\hat{\alpha}_i \cdot F + (1 - \hat{\alpha}_i \cdot B) - \alpha_i|.$$

Composition loss helps the model in learning from the compositional perspective to generate more accurate alpha mattes. Image matting system 300 can also use the gradient loss, defined as the $\ell 1$ difference between edge gradients (Sobel) of predicted and ground-truth alpha mattes, as provided in Equation 7:

$$\mathcal{L}_G = \frac{1}{|u|} \sum_{i \in u} |\Delta \hat{\alpha}_i - \Delta \alpha_i|.$$

The edge gradient loss helps in recovering the boundary-sensitive information. However, image matting system 300 can use the Gabor filter-based cost functions to recover the more comprehensive features for finer edgy and texture details. For improving the visual quality of the grayscale images, Gabor loss works the same as Perceptual loss does with RGB images. Gabor loss can be defined as provided in Equation 8:

$$\mathcal{L}_{Gab} = \frac{1}{|u|} \sum_{i \in u} \sum_{k \in g} \|k(\hat{\alpha}_i) - k(\alpha_i)\|_2^2,$$

where k(.) denotes the convolution operation using Gabor filter and G denotes the set of different Gabor filters. With this, image matting system 300 use a specific optimization rule for each module of our framework.

Learning $\theta_S$ and $\theta_H$ is now discussed. Image matting system 300 can train the $\theta_S$ and $\theta_H$ using following set of loss functions as defined in Equation 9:

Learning $\theta_P$ is now discussed. The $\theta_P$ routes the input patch to desired network among $\theta S$ and $\theta_H$ based on the extent of recovery. Image matting system 300 can enable the $\theta_P$ to know if it has made the correct decision. To induce such decision-making ability, image matting system 300 can use supervision approach in a relative manner. For this, image matting system 300 can first assign the ground-truth labels for the supervised learning of $\theta_P$. Given a patch, if $\theta_P$ routes it to $\theta_S$, whereas $\theta_H$ is capable of producing better alpha matte, then image matting system 300 can penalize the $\theta_P$ network else image matting system 300 can use in its decision of routing to $\theta_S$. Using this, image matting system 300 first generates the set of ground-truth labels for a given batch of inputs, denoted as yep. Here, $\hat{y}_{\theta P}$ denotes the output of $\theta_P$ for a given batch of inputs. Then, image matting system 300 computes the binary-cross entropy loss between $\hat{y}_{\theta P}$ and $\hat{y}_{\theta P}$, as follows in Equation 10:

$$\mathcal{L}_{\theta_P} = -(y_{\theta_P} * \log(\hat{y}_{\theta_P}) + (1 - y_{\theta_P}) * \log(1 - \hat{y}_{\theta_P})).$$

Image matting system 300 can evaluate the loss on full patch provided supra.

Learning $\theta_F$ is now discussed. In addition to reconstruction, compositional and gradient, image matting system 300 can use the Gabor loss defined in Equation 8 to train the $\theta_F$. Image matting system 300 can use the local residuals outputs: $A_1^c, A_2^c, \ldots, A_D^c$ from $\theta_F$ and define the loss function as provided in Equation 11:

$$\mathcal{L}_{gab}^r = \sum_{i \in \mathcal{D}} w_i * \mathcal{L}_{Gab}(A_i^c, \hat{\alpha}),$$

where $w_i$ denotes the weight constant assigned as i/D, for each local residual. The constant is minimum for $A_1^c$ and maximum for $A_D^c$. Hence, initial RDB blocks learn easy classes of textures which are missing in the input to $\theta_F$, whereas later ones learn the complex. As a result, the successive RDB blocks adaptively recover the missing texture and boundary-sensitive details upon preceding RDB blocks outputs. Image matting system 300 can relax the flexibility of judging the easy and complex textures and let $\theta_F$ discover on its own using the feedback from the above redefined Gabor loss. The $\theta_F$ is finally trained using the following loss function as provided in Equation 12:

$$\mathcal{L}_{\theta_F} = \mathcal{L}_R + \mathcal{L}_C + \mathcal{L}_G + \mathcal{L}_{Gab}^r.$$

Figure 6:
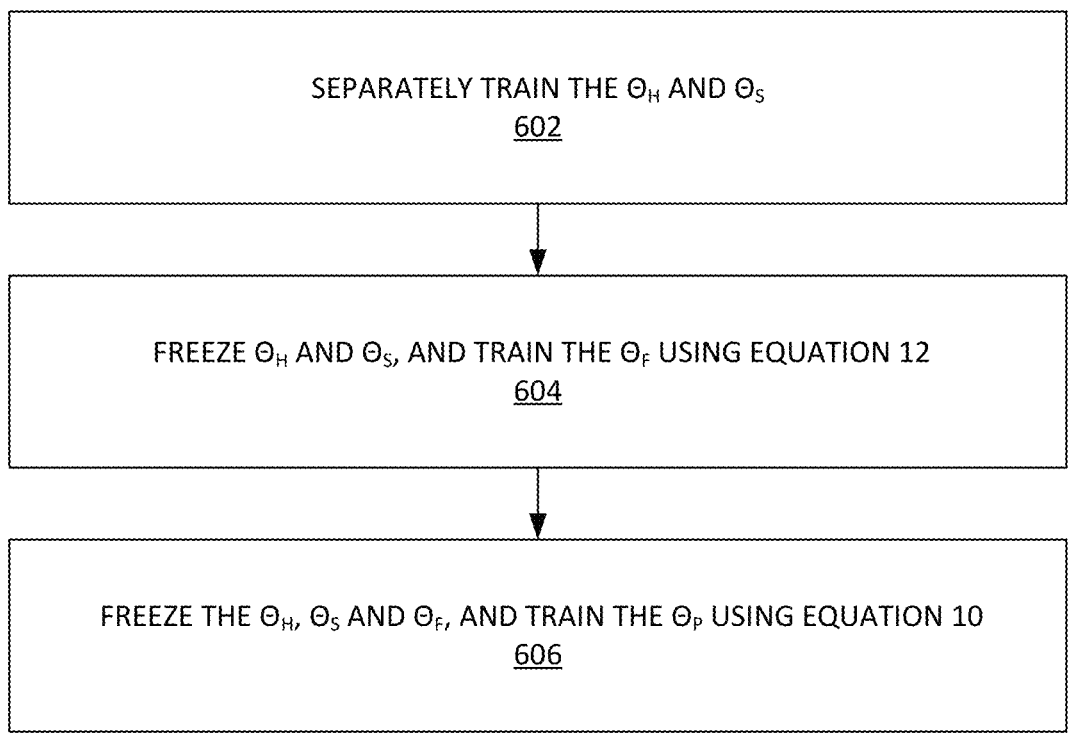
FIG. 6 illustrates an example process for stage-wise training of a hierarchical framework, according to some embodiments.

FIG. 6 illustrates an example process 600 for stage-wise training of a hierarchical framework, according to some embodiments. In step 602, process 600 can train the $\theta_H$ and $\theta_S$, separately (e.g. using Equation 9). At this step, $\theta_H$ and $\theta_S$ are trained on full images.

In step 604, process 600 can then freeze $\theta_H$ and $\theta_S$, and train the $\theta_F$ using Equation 12. At this step, process 600 can input the patches randomly to $\theta_H$ and $\theta_S$ with an equal distribution, on an average.

In step 606, process 600 can then freeze the $\theta_H$, $\theta_S$ and $\theta_F$, and train the $\theta_P$ using Equation 10.

Figure 7:
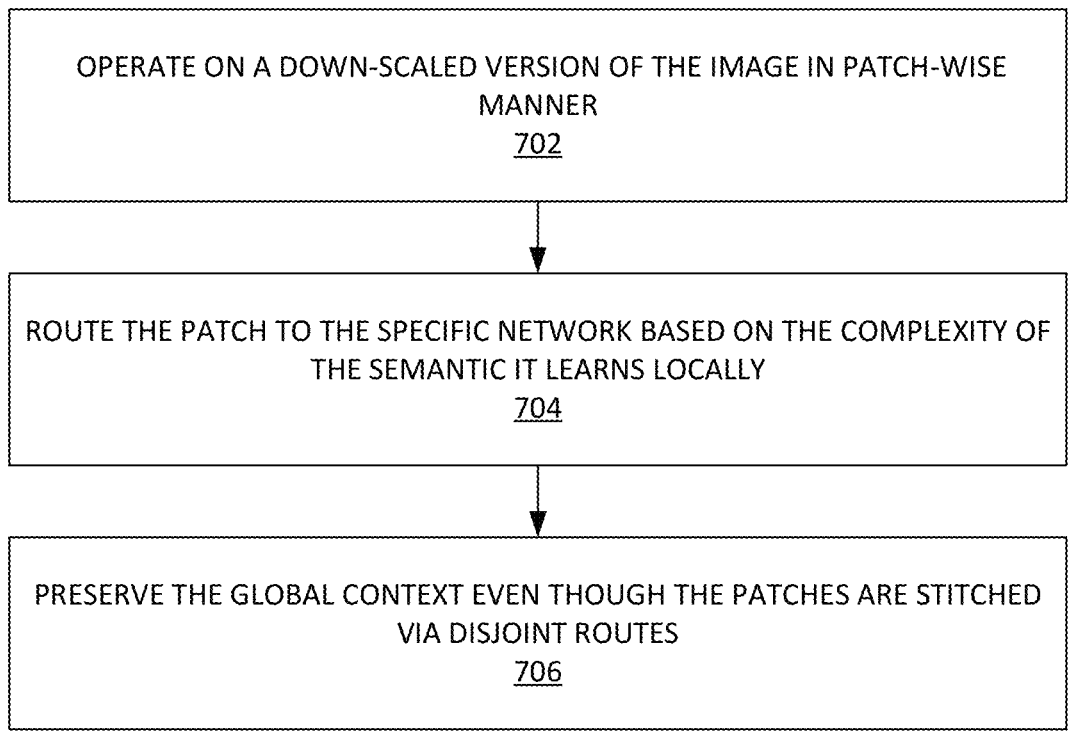
FIG. 7 illustrates another example process utilized herein, according to some embodiments.

FIG. 7 illustrates another example process 700 utilized herein, according to some embodiments. In step 702, process 700 operates on a down-scaled version of the image in patch-wise manner. In step 704, process 700 routes the patch to the specific network based on the complexity of the semantic it learns locally. Process 700 does not use any patch correlation measure. In step 706, the $\theta_F$ preserves the global context even though the patches are stitched via disjoint routes. Process 700 does not refine alpha matte by preserving the confident regions from previous layers and current layer while only focuses on refining the regions lacking it. Process 700 utilizes model intelligence and loss function:

$$\mathcal{L}_{Gab}.$$

Additional Systems and Architecture

Figure 8:
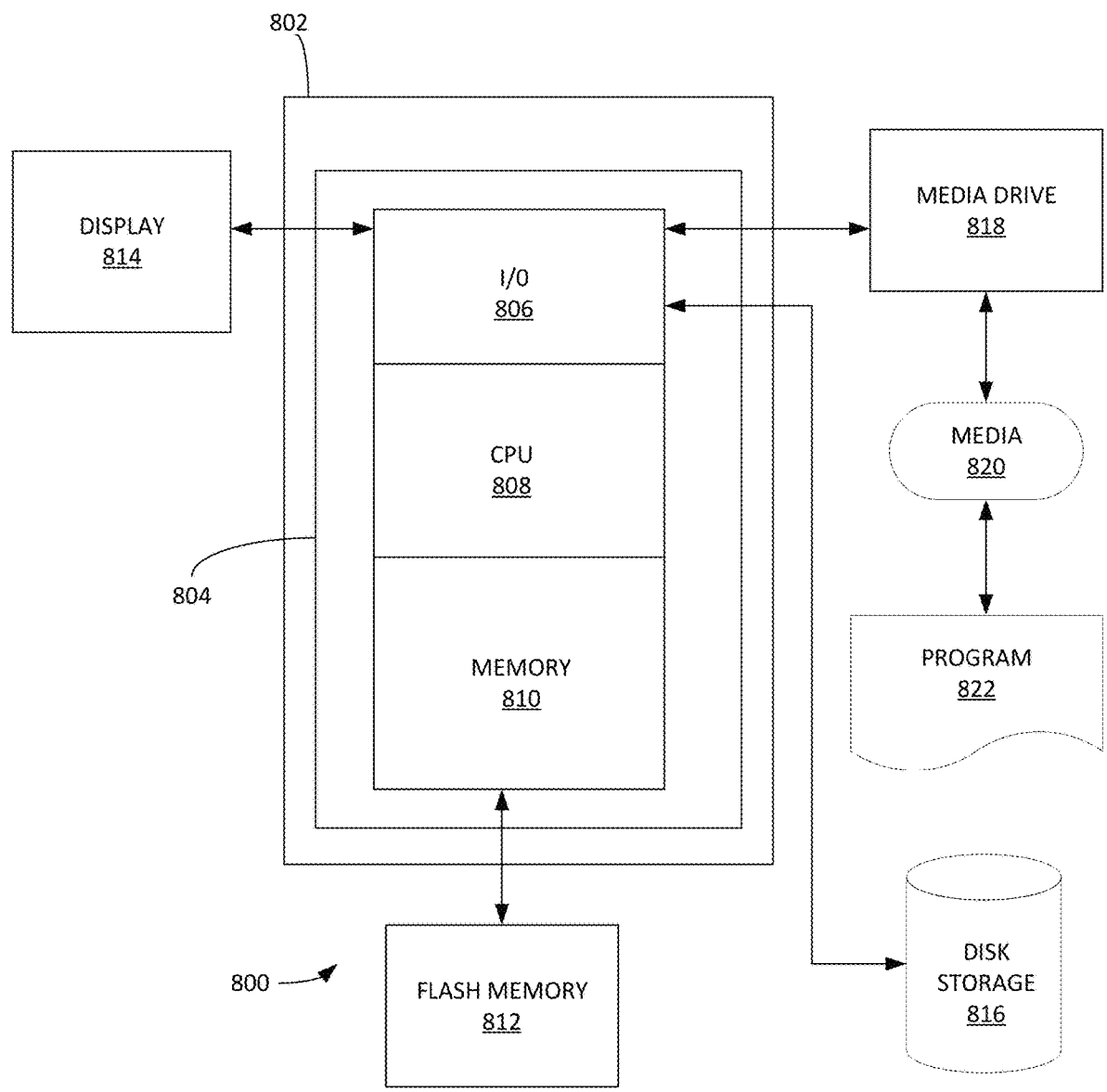
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A computerized method for implementing a hierarchical image matting framework comprising:
   with a hierarchical image matting framework:
   analyzing a plurality of patches in a set of input images;
   determining a complexity of each image in the set of input images, and
   processing each image according to the complexity of each image to determine a plurality of complex patches of each image and a plurality of simpler patches of each image;
   routing a plurality of complex patches with finer details to a computationally heavier network;
   routing a plurality of those with simpler patches of each image to a relatively lighter network; and
   fusing the outputs from the computationally heavy network and the computationally light network to obtain a plurality of alpha mattes.

2. The method of claim 1, wherein the finer detail of the complex patch comprises a furry edge.

3. The method of claim 1, wherein the computationally heavy network comprises an encoder-decoder framework with a plurality of residual stacked blocks.

4. The method of claim 3, wherein an encoder portion of the computationally heavy network comprises a ResNet or equivalent convolutional or transformer blocks based network of high complexity.

5. The method of claim 3, wherein a decoder portion of the computationally heavy network comprises another ResNet or equivalent convolutional or transformer blocks based network of high complexity.

6. The method of claim 1, wherein an image matting system utilizes a spectral normalization and an ReLU activation function after each convolution layer.

7. The method of claim 1, wherein the computationally light network comprises an encoder-decoder based framework comprising fewer layers than the computationally heavy network, based on convolutional or transformer blocks.

8. The method of claim 7, wherein the computationally light network does not comprise of heavy residual networks as backbones.

9. The method of claim 8, wherein the computationally light network comprises n-number convolutional blocks.

10. The method of claim 9, wherein each convolution block of the computationally light network comprises an encoder and a plurality of decoders with skip connections.

11. The method of claim 10 further comprising:
   using an ASPP module to exploit a plurality of multiscale features using a larger field-of-view to obtain a plurality of precise alpha mattes.

12. The method of claim 11 further comprising:
   using a batch normalization operation to obtain a plurality of precise alpha mattes.

13. The method of claim 12 further comprising:
   using a patch complexity estimator to determine the plurality of complex patches of each image and the plurality of simpler patches of each image.

14. The method of claim 13, wherein the patch complexity estimator routes each patch to the computationally heavy network or the computationally light network using the following equation to output a scalar [0,1]:

$$m_{C_p^i} = \begin{cases} \theta_{\mathcal{H}}(C_p^i), & \text{if } \theta_{\mathcal{P}}(C_p^i) \geq 0.5 \\ \theta_{\mathcal{S}}(C_p^i), & \text{otherwise} \end{cases}.$$

15. The method of claim 14, wherein when an output is below 0.5, then image matting system processes the input patch using the computationally light network, otherwise using computationally heavy network.

* * * * *